US012566667B2

(12) United States Patent
Urkude et al.

(10) Patent No.: US 12,566,667 B2
(45) Date of Patent: Mar. 3, 2026

(54) MANAGING PARITY OPERATIONS USING CONTROLLER-SPECIFIC PARITY BITMAPS

(71) Applicant: NetApp, Inc., San Jose, CA (US)

(72) Inventors: Suhas Girish Urkude, San Ramon, CA (US); Tandra De, Milpitas, CA (US); Ratnesh Gupta, Dublin, CA (US); Bharath Kumar Nachenahalli Bhuthegowda, Newark, CA (US); Deepan Natesan Seeralan, Cary, NC (US)

(73) Assignee: NetApp, Inc., San Jose, CA (US)

( * ) Notice: Subject to any disclaimer, the term of this patent is extended or adjusted under 35 U.S.C. 154(b) by 0 days.

(21) Appl. No.: 18/926,809

(22) Filed: Oct. 25, 2024

(65) Prior Publication Data

US 2026/0050518 A1       Feb. 19, 2026

Related U.S. Application Data

(60) Provisional application No. 63/684,109, filed on Aug. 16, 2024.

(51) Int. Cl.
G06F 11/10              (2006.01)
(52) U.S. Cl.
CPC .............................. G06F 11/1096 (2013.01)
(58) Field of Classification Search
CPC .................................................. G06F 11/1096
See application file for complete search history.

(56) References Cited

U.S. PATENT DOCUMENTS 6,041,423 A * 3/2000 Tsukerman ......... G06F 11/1076
                                                714/E11.034
7,827,441 B1 * 11/2010 Wenzel ............... G06F 11/2089
                                                711/131
2005/0165862 A1 7/2005 Loafman et al.
2017/0031791 A1 * 2/2017 Pan ..................... G06F 11/1662

FOREIGN PATENT DOCUMENTS

WO       2016093937 A1   6/2016

* cited by examiner

*Primary Examiner* — Joseph R Kudirka

(57) ABSTRACT

The disclosure describes systems, devices, and methods for tracking operations of controllers in a data storage environment on a per-controller basis. In an implementation, a method for re-performing an incomplete operation is provided. In the method, a controller reads, from a parity drive in the data storage environment, a parity bitmap associated with the controller. The parity bitmap includes sections each corresponding to a different controller in the data storage environment, and each section includes status indicators at specific locations indicative of a status of parity data stored at corresponding locations of a parity region of the parity drive. For each incomplete status indicator, the controller re-computes parity data based on source data associated with the status indicator, stores the parity data at a location of the parity region corresponding to a location of the status indicator in the parity bitmap, and updates the status indicator from incomplete to complete.

20 Claims, 11 Drawing Sheets

400

200

IDENTIFY NODE-SPECIFIC REGION
OF META DATA                201

EVALUATE BIT MAP DATA
FOR INCOMPLETE PARITY DATA        203

NEXT
BIT
?        205

YES

NO

OBTAIN DATA FROM OTHER DRIVES        207

REBUILD PARITY DATA        209 start end

302

| IO 164 | Location 165 | Parity String 166 |
|---|---|---|
| 109-1 | R43, C101 | 011001011111 |

| Bitmap Loc. 167 | Location 165 | Status ID 168 |
|---|---|---|
| 158 - R23, C47 | R43, C101 | 1 |

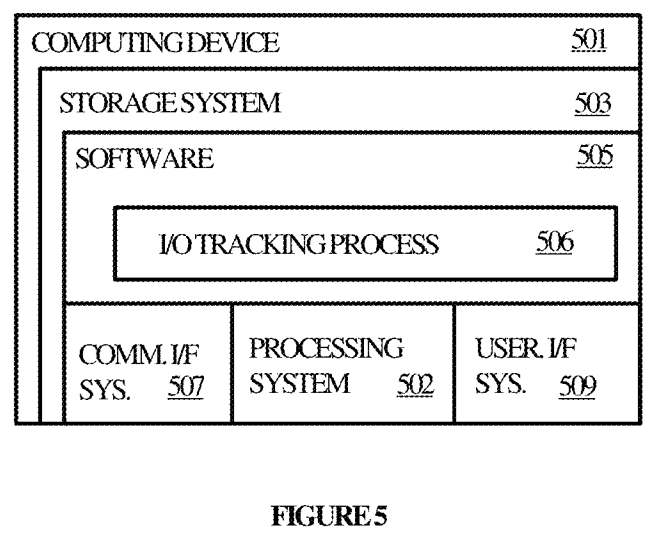

COMPUTING DEVICE 501

STORAGE SYSTEM 503

SOFTWARE 505

I/O TRACKING PROCESS 506

COMM. I/F SYS. 507

PROCESSING SYSTEM 502

USER I/F SYS. 509

FIGURE 5

MANAGING PARITY OPERATIONS USING CONTROLLER-SPECIFIC PARITY BITMAPS

RELATED APPLICATIONS

This application hereby claims the benefit and priority to U.S. Provisional Patent Application No. 63/684,109, titled "MANAGING RAID GROUP INTEGRITY AND CONSISTENCY IN A DISTRIBUTED SHARED-EVERYTHING ARCHITECTURE," filed Aug. 16, 2024, which is hereby incorporated by reference in its entirety.

TECHNICAL FIELD

Embodiments of the present disclosure relate generally to data storage technology, and in particular, to data recovery techniques in data storage contexts.

BACKGROUND

A typical architecture of a data storage environment includes a host device, a controller, and storage devices capable of storing data. The host device interfaces with users to receive input/output requests for accessing the storage devices, and the host device communicates the input/output requests to the controller. The controller then interfaces with the storage devices to access locations in the storage devices specified in the input/output requests. The input/output requests refer to read operations, in which the controller reads data from the storage devices, and write operations, in which the controller writes data to the storage devices.

A one-to-one architecture in data storage contexts refers to an arrangement in which each controller in a data storage environment accesses a specific subset of storage devices in the data storage environment but does not interface with nor control other subsets of storage devices. Problematically, adding or replacing controllers to increase compute power in the environment requires adding or replacing associated storage devices given the nature of the architecture. Not only does this increase the cost of upgrading or replacing existing hardware, but also this increases the time and processing capacity required to replace equipment. Furthermore, the maximum compute power and efficiency of the overall system is limited based on the capabilities and bandwidth of a controller as input/output operations are not parallelized among multiple controllers.

Other problems also exist with such architectures. For example, when a controller or associated storage device fails, the entire portion of the data storage environment may be unavailable until recovery operations are performed. To improve redundancy and recovery in one-to-one data storage architectures, each subset of storage devices can be made up of several inexpensive data disks and a parity disk that provide redundancy with respect to each other. However, these redundancy groups rely upon a single controller scheme and shared metadata, which means the storage devices of a given group still fail together when issues occur.

SUMMARY

The technology described herein utilizes a shared-everything architecture for a data storage environment including multiple controllers and storage devices organized into redundancy groups (e.g., Redundant Array of Inexpensive Disks (RAID) groups). In this architecture, any controller can access any storage device, and each controller is allocated specific blocks of storage in each of the storage devices. While generally applicable to numerous endeavors, such advantages may be especially useful in data storage environments and input/output (I/O) processing applications.

In an implementation, a method for operating a controller in a data storage environment to provide I/O tracking and recovery operations is provided. A controller in the data storage environment performs such a method when the controller, or a previous controller replaced by this controller, fails to complete an I/O operation (e.g., a write operation) across all applicable storage devices in a redundancy group. When a controller fails to complete an I/O operation, some storage devices continue to store outdated data that needs to be updated. The status of the I/O operation is stored as metadata in a storage device of the redundancy group. Upon determining an incomplete I/O operation, the controller identifies the failed controller, parity data associated with the failed controller and the incomplete I/O operation, and data written to the storage devices in performance of the I/O operation. Then, the controller uses that information to recompute the lost data.

This Overview is provided to introduce a selection of concepts in a simplified form that are further described below in the Technical Disclosure. It may be understood that this Overview is not intended to identify key features or essential features of the claimed subject matter, nor is it intended to be used to limit the scope of the claimed subject matter. These and other features and aspects of various examples may be understood in view of the following detailed discussion and accompanying drawings.

BRIEF DESCRIPTION OF THE DRAWINGS

For a more complete understanding of the present invention(s), and the advantages thereof, reference is now made to the following descriptions taken in conjunction with the accompanying drawings.

FIG. 5 illustrates a computing system suitable for implementing the various systems, operational environments, architectures, environments, methods, processes, scenarios, sequences, and frameworks discussed below with respect to the other Figures.

Corresponding numerals and symbols in different figures generally refer to corresponding parts unless otherwise indicated. The figures are drawn to clearly illustrate the relevant aspects of the preferred embodiments and are not necessarily drawn to scale.

DETAILED DESCRIPTION

Figure 1:
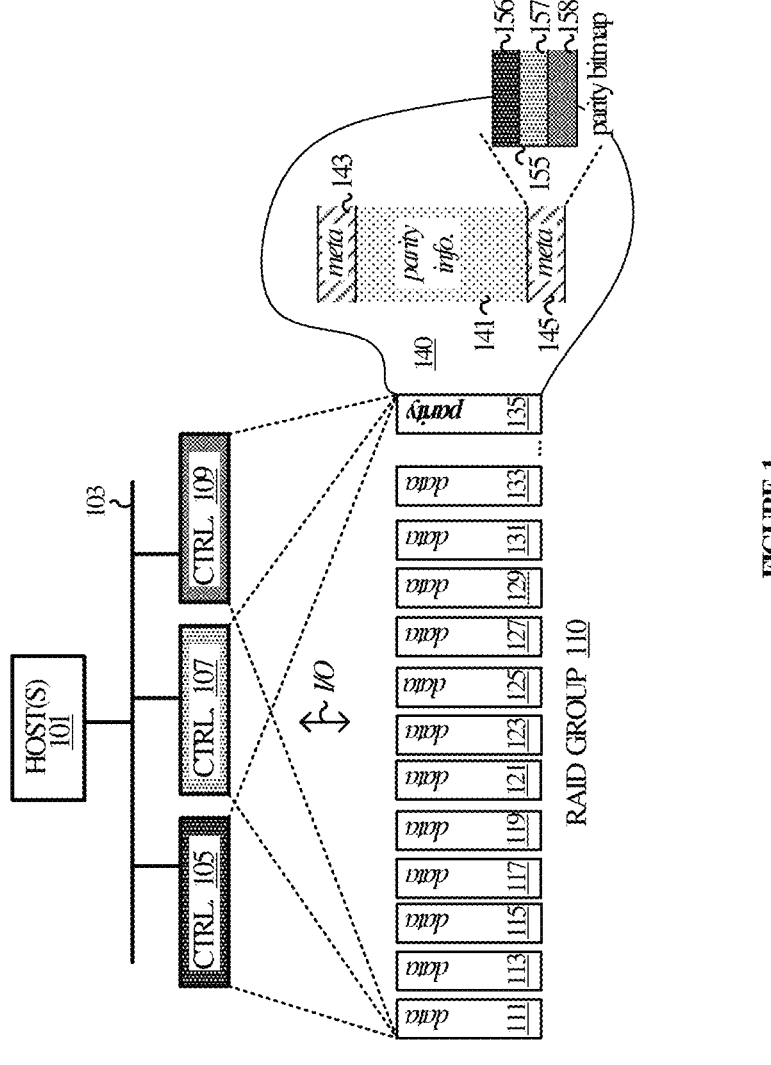
FIG. 1 illustrates an example data storage system in an implementation.

Technology is disclosed herein that mitigates the problems discussed above with respect to data recovery in existing data storage architectures by utilizing a shared-everything architecture in which each controller is capable of accessing any storage device. In a shared-everything architecture, a single pool of storage devices (referring interchangeably to the terms storage device, disk, and drive) may be utilized for an entire cluster of controllers (referring interchangeably to the terms controllers and nodes) with equal and common access to the storage devices by the controllers.

The storage devices in the data storage environment are collectively referred to as a storage aggregate. The storage aggregate is divided into multiple RAID groups (e.g., sets of drives or disks providing RAID functionality, where RAID stands for Redundant Array of Independent Disks), and each RAID group includes one or more data disks and one or more parity disks that provide redundancy with respect to each other. The arrangement of the RAID groups, and the storage devices in each RAID group, is referred to as the aggregate layout. In defining the aggregate layout, each controller in the data storage environment may be allocated a range of blocks (e.g., logical or physical address spaces) on each storage device across all the storage devices within the same RAID group (the blocks across all the storage devices being referred to as a stripe). This allows each controller to write in parallel to the same set of storage devices without corrupting each other's data.

When performing input/output (I/O) operations, such as write requests, each controller writes to a particular stripe in parallel or sequentially and indicates a completion of the I/O operation in a parity disk. In the event of a controller outage during a write operation, it is possible that the controller writes to only a subset of the storage devices before failure, and thus other storage devices within a group of storage devices (e.g., a RAID group) continue to hold old data. Following a re-boot of the controller, the storage devices holding old data need to undergo recovery operations, which may include determining new data to overwrite the old data by using parity data stored on a parity disk. However, existing solutions fail to provide the ability to pursue such recovery operations as input/output operations are not tracked on a per-controller basis nor do such solutions associate parity data at the controller level to track which parity data belongs to which controller. Without such tracking and redundancy, recovery operations are difficult and time-consuming.

In some cases, it may be important to track information on a per-node basis for each RAID group. For example, it may be advantageous to track the ongoing I/O operations to a stripe in the RAID group to determine consistency point bits, dirty region logging bits, whether a failed node had a dirty or clean shutdown, and a failed disk registry. Such information is tracked at a shared space, such as in a parity disk, so that if a failed controller is replaced, the subsequent recovery can be carried out using the replacement controller to maintain data integrity. The above problem requires that each node is able track respective metadata independent of other nodes and without needing any extra coordination since that can slow down the I/O operations.

To alleviate these issues, as disclosed herein, recovery operations are performed based on associating data and input/output (I/O) operations on a per-controller basis. The status of I/O operations is also tracked by controller. Upon indication of an incomplete I/O operation, such as in a case of controller failure, recovery operations are initiated to recompute parity data and/or other lost data associated with the I/O operation. In particular, techniques described herein allow the identification of which parity bits need to be re-computed based on identifying a section of the metadata bitmap associated with the failed controller. The controller, or a replacement controller, then rebuilds a corresponding portion of the parity data based on checking a respective parity bitmap associated with the portion of the parity data for indications of any incomplete parity writes by the failed controller. Advantageously, this scheme allows each node in the cluster to operate independently of other nodes while providing the consistency and integrity for the RAID group that is shared across all of the nodes.

FIGS. 1, 2, and 3A-3G below illustrate and describe additional details of such systems, devices, and methods.

FIG. 1 illustrates an example data storage system in an implementation. FIG. 1 shows system 100, which includes host(s) 101, controllers 105, 107, and 109, and RAID group 110. RAID group 110 may include a plurality of storage devices, including data disks and parity disks. In various embodiments, controllers 105, 107, and 109 may be configured to perform metadata management processes, such as process 200 of FIG. 2.

System 100 is representative of a data storage system operating in a data storage environment. System 100 includes multiple controllers and multiple storage devices (e.g., drives) arranged in a shared-everything architecture such that each of the controllers is capable of accessing any of the storage devices. In particular, controllers 105, 107, and 109 can perform input/output (I/O) operations (e.g., read operations, write operations) with all of the storage devices of RAID group 110.

Host(s) 101 (hereinafter referred to as host 101) is representative of one or more host servers, applications, devices, systems, or the like, capable of providing I/O operations to controllers 105, 107, and 109. Host 101 may include and may be implemented in hardware, software, and/or firmware, as well as combinations and variations thereof.

By way of example, host 101 is representative of a server running an application that interfaces with system 100 via network 103 to read from and write to the storage devices of system 100. An end user accesses host 101, or the application thereof, via a user device (e.g., a computer, a tablet, a smartphone), and provides requests to perform I/O operations via one of controllers 105, 107, or 109 to access the storage devices. In such an example, host 101 may be running a data storage administration and management application representative of data management software (e.g., NetApp ONTAP) capable of providing data management operations such as storage configuration, data protection, network setup and management, and risk and node and cluster performance monitoring, among other functions. Host 101 provides the I/O requests to controllers 105, 107, and/or 109, using an interface (e.g., a command line interface (CLI)) to the application over an application programming interface (API) (e.g., a RESTful API).

Controllers 105, 107, and 109 are representative of control devices or systems that each include one or more processing devices capable of controlling, managing, and accessing each of the storage devices of system 100. Examples of the processing devices may include one or more central processing units (CPUs), general purpose processors, Application Specific Integrated Circuits (ASICs), microcontroller units (MCUs), digital signal processors (DSPs), field-programmable gate arrays (FPGAs), and the like. In some examples, controller 105 may represent two or more controllers coupled as high availability (HA) pairs for at least fault tolerance and back-up purposes.

In various examples, controllers 105, 107, and 109 are configured to run an instance of the data storage management application also running on host 101 to perform the I/O operations received from host 101. As such, the controllers interface with host 101 via the application in accordance with a storage network and access protocol, such as Non-Volatile Memory Express (NVMe). Other protocols such as Network File System (NFS), Server Message Block protocol (SMB), Internet Small Computer System Interface (iSCSI), Fiber Channel (FC), Fiber Channel over Ethernet (FCOE), and the like may be contemplated. Controllers 105, 107, and 109 may further interface with the storage devices of RAID group 110 over one of the network protocols at which the controllers perform the I/O operations.

RAID group 110 is representative of a group or array of storage that provide redundancy with respect to one another. Examples of the storage devices include flash disks and/or capacity drives, such as hard-disk drives (HDDs) and solid state drives (SSDs), as well as combinations and variations thereof. As illustrated in system 100, RAID group 110 includes data disks 111, 113, 115, 117, 119, 121, 123, 125, 127, 129, 131, and 133 (collectively referred to as the data disks) and parity disk 135. In some embodiments, RAID group 110 may include additional or fewer data disks and/or parity disks. Additionally, system 100 may include additional RAID groups, each including multiple data disks and one or more parity disks, that can be accessed by each of controllers 105, 107, and 109.

In various embodiments, each controller of system 100 interfaces with RAID group 110, as well as each data and parity disk of RAID group 110, based on the shared-everything layout. In other words, controllers 105, 107, and 109 each have access to some or all of the RAID groups and data and parity disks thereof and may provide I/O requests to the data and parity disks to write to or read from the disks of RAID group 110.

The data disks of RAID group 110 include storage devices that store data written to locations of the storage devices by controllers 105, 107, and 109. Parity disk 135 of RAID group 110 stores parity data 140 based on the data stored in each of the data disks. For example, parity disk 135 stores metadata 143, parity information 141, and metadata 145. In some examples, the data disks of RAID group 110 may additionally, or instead, store metadata 143 and 145.

Metadata 143 includes metadata corresponding to parity disk 135, to RAID group 110, and to data disks of RAID group 110, as well as a layout thereof, for example.

Parity information 141 includes parity data computed by the controllers of 100 upon completion of I/O operations (e.g., read operations, write operations). More specifically, parity disk 135 stores parity information 141 determined by performing a parity operation (e.g., a logical operation performed using XOR logic) with corresponding data bits stored in the data disks. In some such embodiments, parity information 141 includes an output corresponding to the XOR operation of a combination of bits from a combination of the data disks of RAID group 110.

Metadata 145 includes parity bitmap 155, which includes multiple sections each corresponding to one of the controllers of system 100. More specifically, parity bitmap 155 includes parity bit maps 156, 157, and 158, which correspond to controllers 105, 107, and 109, respectively (i.e., node-specific regions). The metadata stored in parity bit maps 156, 157, and 158 includes bits (referring interchangeably to the terms bits, values, and indicators) indicative of a status of an I/O operation performed by controllers 105, 107, and 109. The bits may be stored at specific locations in a respective section, and the specific locations correspond to locations in parity information 141 that holds the parity data associated with the I/O operation. In some embodiments, parity bitmap 155 may include additional bit maps split out by controller based on system 100 including additional controllers.

In operation, the controllers of system 100 perform I/O operations, such as write operations, in which the controllers write data to the data disks and parity data to the parity disk of RAID group 110. Upon completion of the I/O operations, the controllers indicate the completion of a given operation in a respective parity bit map. In particular, a controller sets a value of a corresponding parity bit of an associated parity bit map on parity disk 135 to indicate the completion. If, however, the controller does not complete the I/O operation, the parity bit of the corresponding parity bitmap may include a value indicative of the incomplete request. Thus, the parity bitmap may be referenced to identify incomplete requests, which may be completed during subsequent operations. Additional detail is described below in process 200 which illustrates a method of identifying incomplete parity operations and re-computing parity data based thereon.

Figure 2:
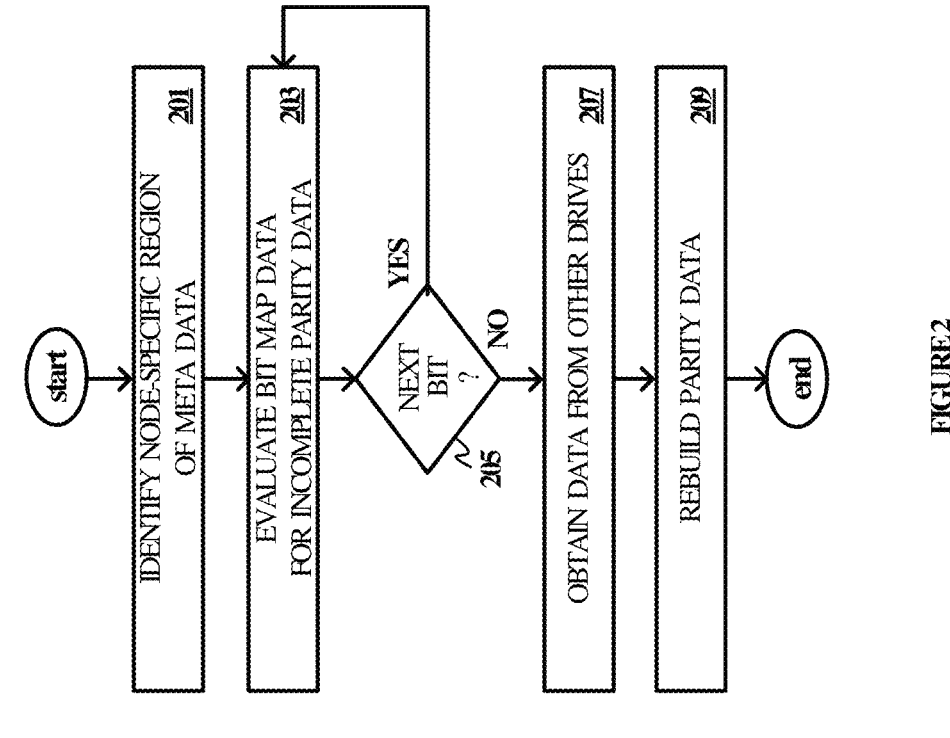
FIG. 2 illustrates a method for managing metadata of storage devices of a data storage system in an implementation.

FIG. 2 illustrates a method for managing metadata of storage devices of a data storage system in an implementation. Process 200 may be employed by a computing device, such as a controller of system 100 (e.g., one of controllers 105, 107, and 109), an example of which is provided by computing system 501 of FIG. 5. Accordingly, process 200 may be implemented in hardware, software, and/or firmware, and may be implemented in program instructions executable by one or more processors of the computing device. The program instructions direct the computing device to operate in accordance with the steps of process 200, which reference elements of FIG. 1.

In operation 201, one of controllers 105, 107, and 109 identifies a node-specific region of metadata stored in parity disk 135 of RAID group 110, such as one of parity bitmaps 156, 157, and 158. To identify one or more of the parity bitmaps, a controller may read metadata stored on parity disk 135 that indicates an assigned parity bit map associated with the controller. For example, controller 105 identifies that parity bit map 156 is associated with I/O operation status and parity data computed by controller 105. Controller 105 is referenced as the controller performing the remainder of the steps below for the sake of convenience.

In operation 203, controller 105 evaluates the metadata parity bit map 156 by reading sections of parity bit map 156. Controller 105 scans parity bit map 156 for status indicators in parity bit map 156 indicative of incomplete parity data, or an incomplete parity operation. By way of example, when controller 105 fails to write data associated with an I/O operation to all of the disks specified in the I/O operation, and/or controller 105 fails to compute parity data based on the I/O operation, a location in parity bit map 156 corresponding to the I/O operation includes a value indicative of incompleteness. The location in parity bit map 156 corresponds to a location where parity data is stored in parity information 141, which may be blank or include stale data if the indicator indicates an incomplete parity operation.

In operation 205, controller 105 identifies each status indicator in parity bit map 156 to determine all of the status indicators having a status of incomplete. Upon finding all of the incomplete indicators, controller 105 proceeds to operation 207.

In operation 207, for each status indicator with a status of incomplete, controller 105 obtains source data from other drives corresponding to the I/O operation associated with the status indicator. This may entail reading data from each of the data disks of RAID group 110 that corresponds to the I/O operation.

In operation 209, controller 105 rebuilds, or re-computes, new parity data based on the source data obtained from the other disks in RAID group 110. For example, the controller computes the new parity data based on performing an XOR operation using the source data. Next, controller 105 stores the new parity data at a location in parity information 141 corresponding to the location of the status indicator found in parity bit map 156. Then, controller 105 updates the status indicator in parity bit map 156 from incomplete to complete.

In this way, the controller can determine if a controller or a drive (e.g., one of the data disks) has failed based on incomplete parity data stored in controller-specific or node-specific parity bitmaps of parity disk 135, and if so, the controller may be able to rebuild the lost data based on other data stored in the other data disks of the RAID group.

FIGS. 3A, 3B, 3C, 3D, 3E, 3F, and 3G illustrate example operating environments in an implementation. FIGS. 3A-3G include and reference elements of FIG. 1, such as system 100 and elements thereof. Elements of FIGS. 3A-3G may be configured to perform metadata and parity bit management processes, such as process 200 of FIG. 2.

Figure 3A:
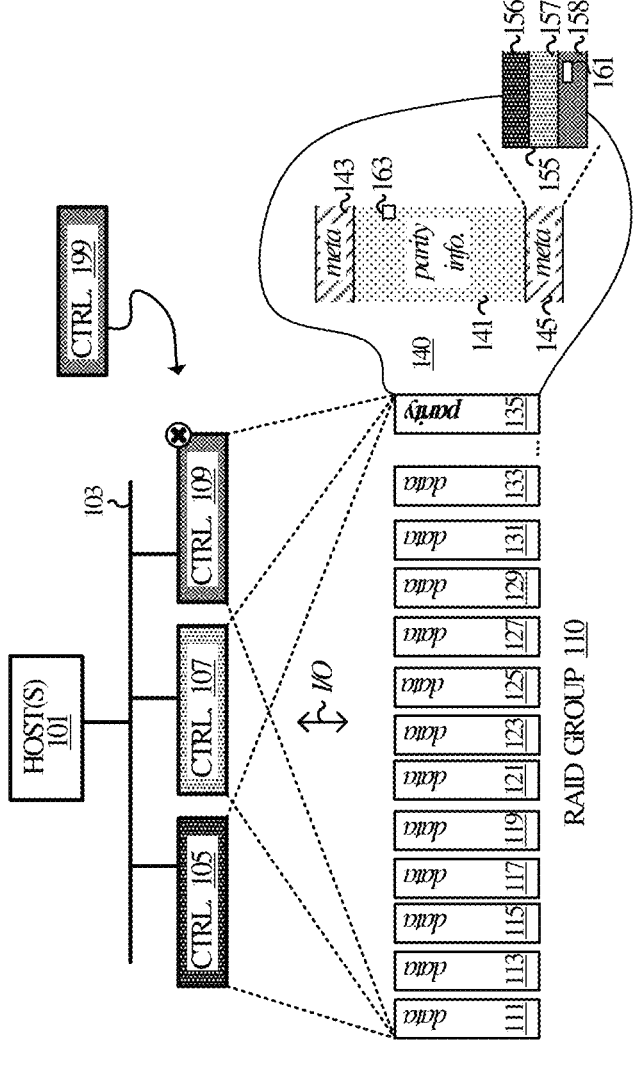
FIGS. 3A, 3B, 3C, 3D, 3E, 3F, and 3G illustrate example operating environments in an implementation.

Referring first to FIG. 3A, FIG. 3A includes a first operating environment in which system 100 may be configured to identify a failed controller based on evaluating metadata 145, and further, to take actions to replace the failed controller with a new controller or reboot the existing controller after a temporary outage.

In an example illustrated in FIG. 3A, during operation, controller 109 fails to complete an I/O operation at RAID group 110 resulting in outdated or incomplete data being stored in the data disks of RAID group 110. Further, based on the failure to complete the I/O operation, controller 109 fails to complete a parity operation associated with the I/O operation resulting in outdated or incomplete parity data at location 163 in parity disk 135.

In parity disk 135, location 163 is located in a region of parity disk 135 where controller 109 stores parity data associated with a particular I/O operation. Status indicator 161 is located in a parity bit map region associated with controller 109 (parity bit map 158). The location of status indicator 161 corresponds to location 163, and thus indicates a status of parity information stored at location 163. Upon completing an I/O operation, controller 109 updates status indicator 161 at parity bit map 158 to indicate the completion of the I/O operation. However, based on the failure to complete the I/O operation and the parity operation, controller 109 fails to change status indicator 161 from incomplete to complete, and thus, status indicator 161 includes a status of complete.

Figure 3B:
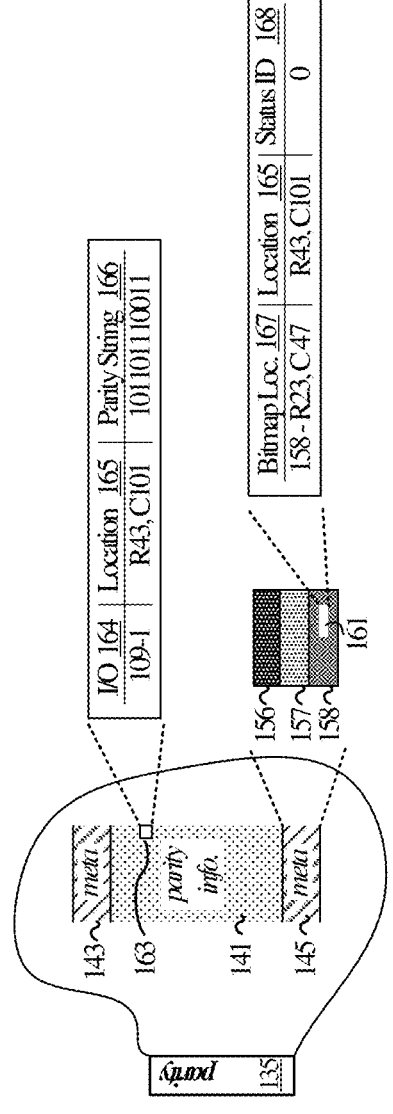

FIG. 3B shows operating environment 301, which includes example representations of location 163 and status indicator 161 in parity disk 135 following the incompletion of I/O and parity operations as in FIG. 3A.

In particular, location 163 includes I/O identifier 164, location 165, and parity string 166. I/O identifier 164 corresponds to a specific I/O operation performed by controller 109. Location 165 includes an address of the parity region of parity disk 135 at which parity string 166 is stored. Parity string 166 includes parity data computed during or after an I/O operation and represents a set of data that can be used to re-compute data stored in other disks of RAID group 110 during the performance of the I/O operation.

Status indicator 161 includes bitmap location 167, location 165, and status identifier 168. Bitmap location 167 includes an address of the parity bit map region of parity disk 135 at which status identifier 168 is stored. Status identifier 168 includes a value indicative of the state (e.g., complete, incomplete) of a parity operation corresponding to an I/O operation associated with I/O identifier 164.

In this example, status indicator 161 includes a value of 0 indicative of an incomplete state of the parity operation. As a result, it may be determined that the I/O operation associated with I/O identifier 164 is also incomplete, and thus, parity string 166 is outdated.

Figure 3C:
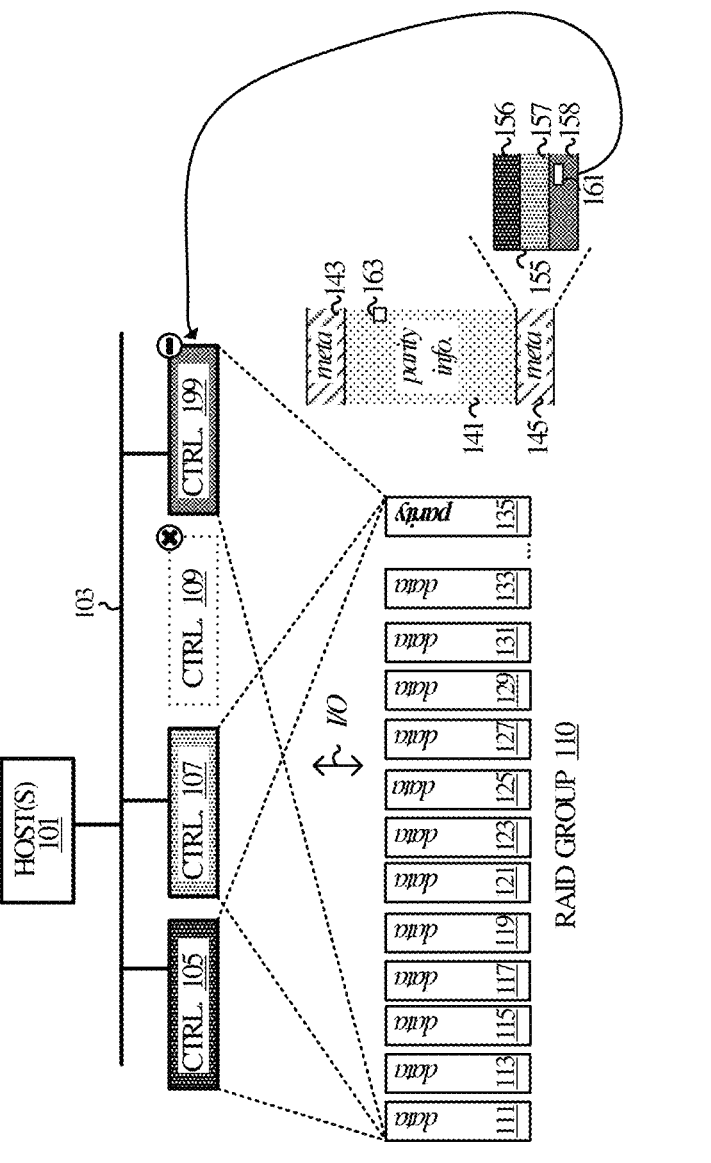

In FIG. 3C, controller 199 is added to system 100 to replace controller 109 that has failed. Consequently, controller 109 is removed from system 100, and controller 199 is added to network 103 to access any of the disks of RAID group 110. Based on being added to system 100, controller 199 reads metadata 145 to determine which parity bit map and parity data is associated with controller 109, now replaced by controller 199. As such, controller 199 determines that parity bit map 158 is associated with controller 109 (and now controller 199), and controller 199 scans parity bit map 158 to determine if there are any incomplete status indicators. Accordingly, controller 199 identifies that status indicator 161 includes a status of incomplete (e.g., based on status identifier 168), and that status indicator 161 corresponds to location 163 of parity information 141 (e.g., based on location 165).

Figure 3D:
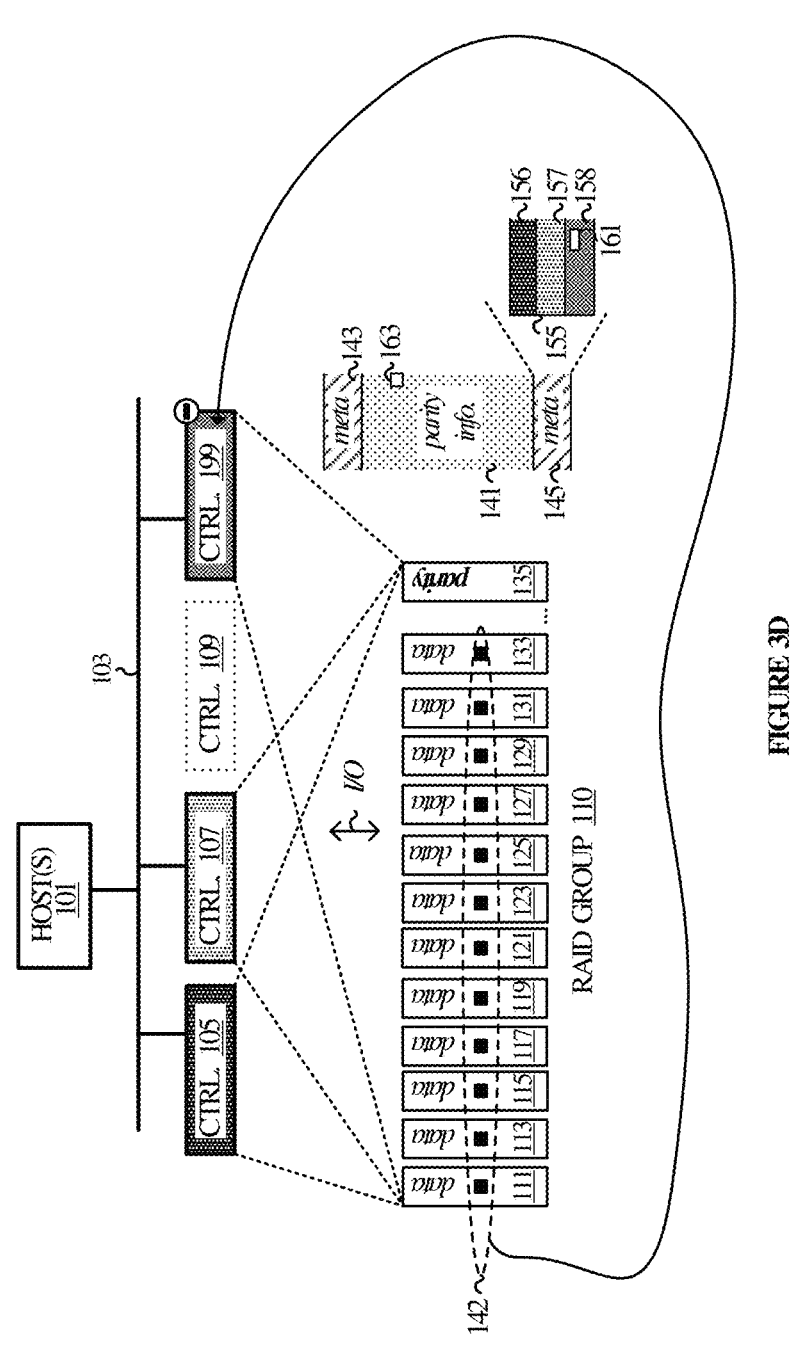

In FIG. 3D, based on determining a state of incompletion with respect to an I/O operation and a corresponding parity operation, controller 199 reads source data 142, which includes data from each of the data disks of RAID group 110 corresponding to the incomplete I/O operation (e.g., the I/O operation associated with I/O identifier 164). This entails reading one or more bits from each of data disk 111, 113, 115, 117, 119, 121, 123, 125, 127, 129, 131, and 133.

Figure 3E:
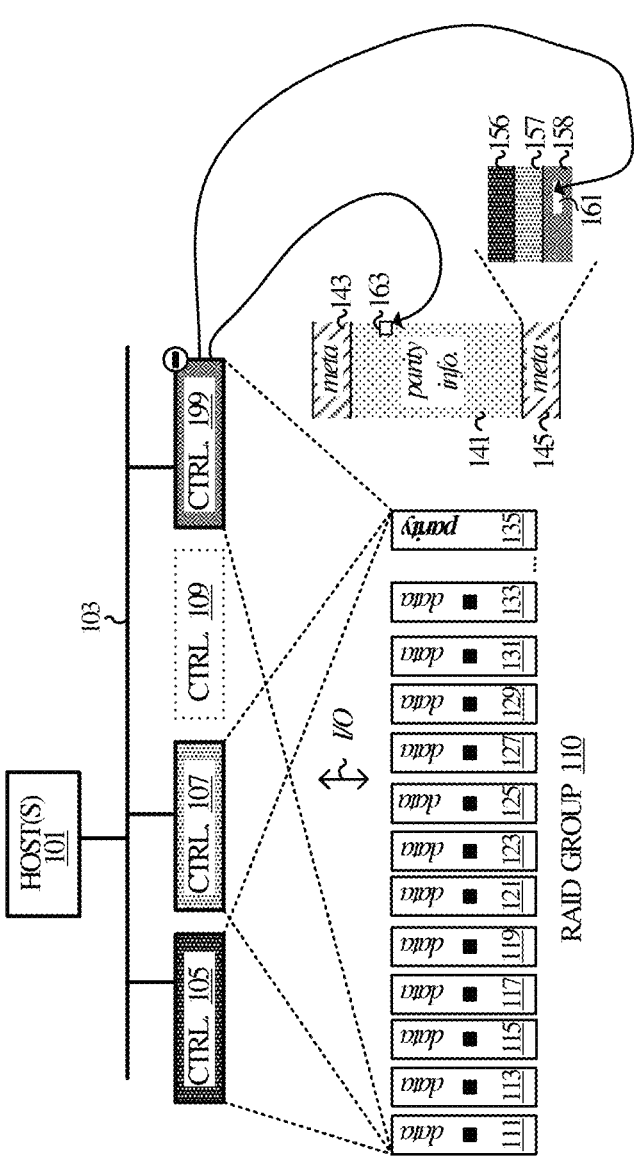

In FIG. 3E, after reading source data 142 from each of the data disks, controller 199 computes new parity data based on performing a parity operation (e.g., an XOR operation) using source data 142. Then, controller 199 stores the new parity data at location 163. Storing the new parity data may entail overwriting any existing parity data in location 163 (e.g., data of parity string 166).

Figure 3F:
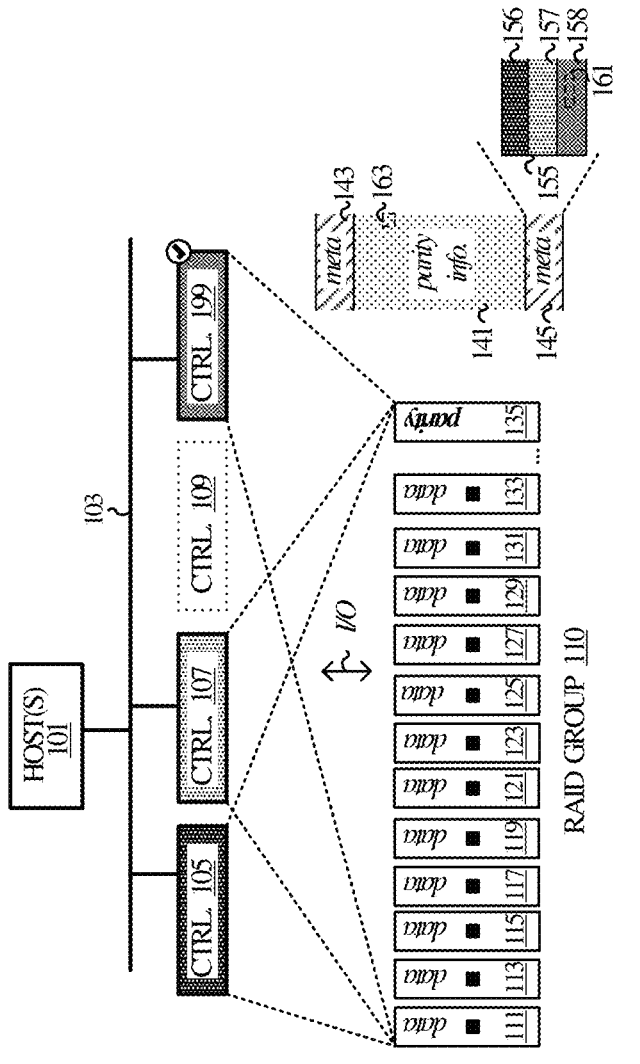

In FIG. 3F, controller 199 updates status indicator 161 from incomplete to complete in response to computing and storing the new parity data in location 163. Controller 199 may repeat these processes to re-compute incomplete parity data that controller 109 failed to write according to indications in parity bit map 158. Following such operations, parity information 141 includes complete parity data at least with respect to controller 109, and now controller 199 that replaced controller 109.

Figure 3G:
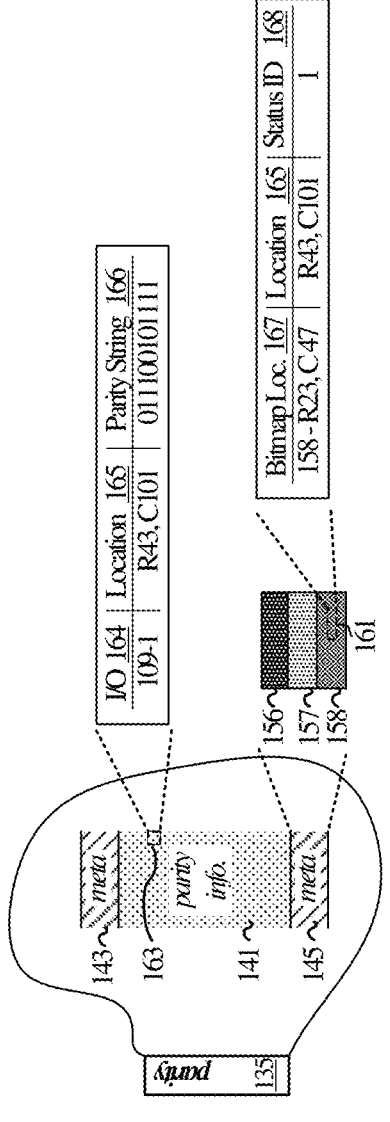

FIG. 3G shows operating environment 302, which includes example representations of location 163 and status indicator 161 in parity disk 135 following the completion of I/O and parity operations in FIGS. 3C-3F.

In particular, based on re-computing parity data and overwriting parity data stored at location 163, parity string 166 includes new parity data. Then, based on the completion of the I/O and parity operations, controller 199 updates status identifier 168 of status indicator 161 from 0 to 1, or from incomplete to complete.

Figure 4:
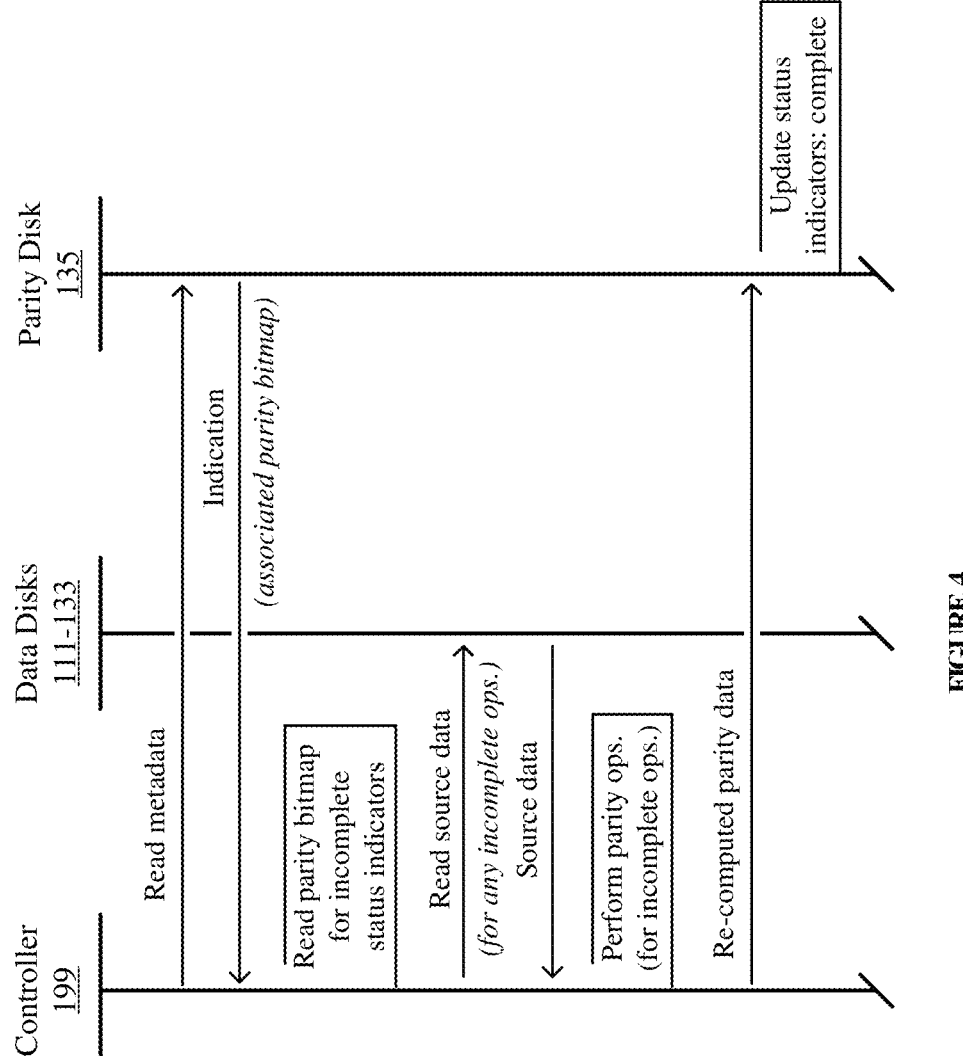
FIG. 4 illustrates an example operational sequence in an implementation.

FIG. 4 illustrates operational sequence 400 demonstrative of an example sequence of events performable by elements of system 100, which includes and references elements of system 100. In particular, operational sequence 400 includes various steps performed by controller 199, data disks 111, 113, 115, 117, 119, 121, 123, 125, 127, 129, 131, and 133, and parity disk 135 of system 100.

To begin operational sequence 400, controller 199 reads metadata from parity disk 135 of RAID group 110 after replacing controller 109 upon failure of controller 109.

Controller 199 identifies an indication from parity disk 135 to determine that controller 199 is associated with parity bit map 158 of parity disk 135.

Next, controller 199 reads parity bit map 158 to determine if there are any incomplete status indicators. In an example, controller 199 identifies that a status indicator (e.g., status indicator 161) for an I/O operation includes a status of incomplete and determines a location in parity disk 135 where corresponding parity data is stored (e.g., a location in parity information 141). Controller 199 then reads source data, which includes data from each of the data disks of RAID group 110 corresponding to the incomplete I/O operation (e.g., the I/O operation associated with I/O identifier 164). This entails reading one or more bits from each of data disk 111, 113, 115, 117, 119, 121, 123, 125, 127, 129, 131, and 133.

Then, controller 199 computes new parity data based on performing a parity operation (e.g., an XOR operation) using the source data. Controller 199 stores the new parity data at parity disk 135 at the location where the missing (or outdated) parity data should be stored. Once the re-computed parity data is stored at parity disk 135, controller 199 updates the incomplete status indicator to complete.

It may be appreciated that developing strategies to mitigate the impact of data loss and disruption of requests to access data and corresponding storage devices due to storage device management processes has become important for enterprises and end users. Failures of storage devices, updates or upgrades to storage devices, and/or failures of controllers with which to manage such storage devices may occur and interrupt access to data.

To mitigate the downtime and disruption introduced when performing storage device upgrades, rebuilds, replacements, and the like, enterprises may utilize various systems, methods, and devices as described herein to manage data management systems, clusters thereof, nodes thereof, and RAID groups including various storage devices (e.g., disks), as well as data and metadata thereof.

The disclosure describes systems, methods, and devices for managing storage devices and the layout thereof in a data storage environment, managing access to the storage devices, and the like in shared-everything data storage system architectures, as well as for at least: 1) separating metadata bitmaps on parity drives of a data storage system by controllers; 2) associating metadata by controllers of a cluster of the data storage system to figure out which parity bits to rebuild based on a failed storage device of the data storage system; and 3) utilizing data on other storage devices to rebuild parity bits to recover data.

Various embodiments of the present technology provide for a wide range of technical effects, advantages, and/or improvements to computing systems and components. For example, various embodiments may include one or more of the following technical effects, advantages, and/or improvements: 1) management of access to storage devices; 2) non-disruptive access to storage devices; 3) management of storage devices and RAID groups of storage devices; 4) scalable controllers and storage devices in a distributed shared-everything architecture; 5) scalable RAID group layouts; and 6) ability to protect against and reconcile updates to storage devices, and metadata thereof, from multiple controllers.

FIG. 5 illustrates computing system 501, which is representative of any system or collection of systems in which the various applications, processes, services, and scenarios disclosed herein may be implemented. Examples of computing system 501 include, but are not limited to server computers, web servers, cloud computing platforms, and data center equipment, as well as any other type of physical or virtual server machine, container, and any variation or combination thereof. (In some examples, computing system 501 may also be representative of desktop and laptop computers, tablet computers, smartphones, and the like.)

Computing system 501 may be implemented as a single apparatus, system, or device or may be implemented in a distributed manner as multiple apparatuses, systems, or devices. Computing system 501 includes, but is not limited to, processing system 502, storage system 503, software 505, communication interface system 507, and user interface system 509. Processing system 502 is operatively coupled with storage system 503, communication interface system 507, and user interface system 509.

Processing system 502 loads and executes software 505 from storage system 503. Software 505 includes and implements I/O tracking process 506, which is representative of the processes discussed with respect to the preceding Figures. When executed by processing system 502, software 505 directs processing system 502 to operate as described herein for at least the various processes, operational scenarios, and sequences discussed in the foregoing implementations. Computing system 501 may optionally include additional devices, features, or functionality not discussed for purposes of brevity.

Referring still to FIG. 5, processing system 502 may include a microprocessor and other circuitry that retrieves and executes software 505 from storage system 503. Processing system 502 may be implemented within a single processing device but may also be distributed across multiple processing devices or sub-systems that cooperate in executing program instructions. Examples of processing system 502 include general purpose central processing units, microcontroller units, graphical processing units, application specific processors, integrated circuits, application specific integrated circuits, and logic devices, as well as any other type of processing device, combinations, or variations thereof.

Storage system 503 may comprise any computer readable storage media readable by processing system 502 and capable of storing software 505. Storage system 503 may include volatile and nonvolatile, removable, and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal. Storage system 503 may be implemented as a single storage device but may also be implemented across multiple storage devices or sub-systems co-located or distributed relative to each other. Storage system 503 may comprise additional elements, such as a controller capable of communicating with processing system 502 or possibly other systems.

Software 505 (including I/O tracking process 506) may be implemented in program instructions and among other functions may, when executed by processing system 502, direct processing system 502 to operate as described with respect to the various operational scenarios, sequences, and processes illustrated herein. For example, software 505 may include program instructions for implementing data, data storage, controller, drive, disk, and data storage management processes and procedures as described herein.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number, respectively. The word "or," in reference to a list of two or more items, covers all of the following interpretations of the word: any of the items in the list, all of the items in the list, and any combination of the items in the list.

The phrases "in some embodiments," "according to some embodiments," "in the embodiments shown," "in other embodiments," "in an implementation," "in some implementations," and the like generally mean the particular feature, structure, or characteristic following the phrase is included in at least one implementation of the present technology, and may be included in more than one implementation. In addition, such phrases do not necessarily refer to the same embodiments or different embodiments.

The above Detailed Description of examples of the technology is not intended to be exhaustive or to limit the technology to the precise form disclosed above. While specific examples for the technology are described above for illustrative purposes, various equivalent modifications are possible within the scope of the technology, as those skilled in the relevant art will recognize. For example, while processes or blocks are presented in a given order, alternative implementations may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed or implemented in parallel or may be performed at different times. Further any specific numbers noted herein are only examples: alternative implementations may employ differing values or ranges.

The teachings of the technology provided herein can be applied to other systems, not necessarily the system described above. The elements and acts of the various examples described above can be combined to provide further implementations of the technology. Some alternative implementations of the technology may include not only additional elements to those implementations noted above, but also may include fewer elements.

These and other changes can be made to the technology in light of the above Detailed Description. While the above description describes certain examples of the technology, and describes the best mode contemplated, no matter how detailed the above appears in text, the technology can be practiced in many ways. Details of the system may vary considerably in its specific implementation, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the technology to the specific examples disclosed in the specification, unless the above Detailed Description section explicitly defines such terms. Accordingly, the actual scope of the technology encompasses not only the disclosed examples, but also all equivalent ways of practicing or implementing the technology under the claims.

To reduce the number of claims, certain aspects of the technology are presented below in certain claim forms, but the applicant contemplates the various aspects of the technology in any number of claim forms. For example, while only one aspect of the technology is recited as a computer-readable medium claim, other aspects may likewise be embodied as a computer-readable medium claim, or in other forms, such as being embodied in a means-plus-function claim. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application to pursue such additional claim forms, in either this application or in a continuing application.

What is claimed is:

1. A method of operating a controller in a data storage environment comprising a storage aggregate that includes multiple drives, and multiple controllers capable of communicating with each of the drives in the storage aggregate, the method comprising, by the controller:

reading, from a parity drive in the storage aggregate, a section of a parity bitmap associated with the controller, wherein the parity bitmap comprises multiple sections corresponding to the multiple controllers, and wherein each section includes status indicators at specific locations in the section indicative of a status of parity data stored at corresponding locations of a parity region of the parity drive; and for each status indicator, of the status indicators, having a status of incomplete:

computing new parity data based on source data associated with the status indicator;

storing the new parity data at a location of the parity region corresponding to a location of the status indicator in the parity bitmap; and updating the status indicator from incomplete to complete.

2. The method of claim 1, wherein the storage aggregate comprises one or more redundancy groups each comprising a subset of the multiple drives that provides redundancy with respect to each other.

3. The method of claim 2, wherein the multiple drives comprise data drives and parity drives, and wherein the subset of the multiple drives of a given redundancy group, of the one or more redundancy groups, comprises two or more data drives and one or more parity drives.

4. The method of claim 3, wherein computing the new parity data based on the source data associated with the status indicator comprises:

obtaining data from two or more drives other than the parity drive; and performing a parity operation using the data resulting in the new parity data.

5. The method of claim 4, wherein:

the two or more drives correspond to a redundancy group of the one or more redundancy groups; and the redundancy group comprises the parity drive.

6. The method of claim 5, wherein the redundancy groups comprise Redundant Array of Independent Disks (RAID) groups.

7. The method of claim 1, wherein storing the new parity data at the location of the parity region corresponding to the location of the status indicator in the parity bitmap comprises overwriting existing parity data at the location of the parity region corresponding to the location of the status indicator in the parity bitmap.

8. A computing apparatus comprising:

one or more computer-readable storage media; and program instructions stored on the one or more computer-readable storage media executable by a processing device that, based on being read and executed by the processing device, direct the processing device to:

read, from a parity drive in a data storage environment, a section of a parity bitmap associated with a controller in the data storage environment, wherein the data storage environment comprises a storage aggregate that includes multiple drives, and multiple controllers capable of communicating with each of the drives in the storage aggregate, wherein the parity bitmap comprises multiple sections corresponding to the multiple controllers, and wherein each section includes status indicators at specific locations in the section indicative of a status of parity data stored at corresponding locations of a parity region of the parity drive; and for each status indicator, of the status indicators, having a status of incomplete:

compute new parity data based on source data associated with the status indicator;

store the new parity data at a location of the parity region corresponding to a location of the status indicator in the parity bitmap; and update the status indicator from incomplete to complete.

9. The computing apparatus of claim 8, wherein the storage aggregate comprises one or more redundancy groups each comprising a subset of the multiple drives that provides redundancy with respect to each other.

10. The computing apparatus of claim 9, wherein the multiple drives comprise data drives and parity drives, and wherein the subset of the multiple drives of a given redundancy group, of the one or more redundancy groups, comprises two or more data drives and one or more parity drives.

11. The computing apparatus of claim 10, wherein to compute the new parity data based on the source data associated with the status indicator, the program instructions direct the processing system to:

obtain data from two or more drives other than the parity drive; and perform a parity operation using the data resulting in the new parity data.

12. The computing apparatus of claim 11, wherein:

the two or more drives correspond to a redundancy group of the one or more redundancy groups; and the redundancy group comprises the parity drive.

13. The computing apparatus of claim 12, wherein the redundancy groups comprise Redundant Array of Independent Disks (RAID) groups.

14. The computing apparatus of claim 8, wherein to store the new parity data at the location of the parity region corresponding to the location of the status indicator in the parity bitmap, the program instructions direct the processing system to overwrite existing parity data at the location of the parity region corresponding to the location of the status indicator in the parity bitmap.

15. One or more non-transitory computer-readable storage media having stored thereon program instructions executable by one or more processors of a data storage environment comprising a storage aggregate that includes multiple drives, and multiple controllers capable of communicating with each of the drives in the storage aggregate, that, when executed by the one or more processors, direct the one or more processors to:

read, from a parity drive in the storage aggregate, a section of a parity bitmap associated with the controller, wherein the parity bitmap comprises multiple sections corresponding to the multiple controllers, and wherein each section includes status indicators at specific locations in the section indicative of a status of parity data stored at corresponding locations of a parity region of the parity drive; and for each status indicator, of the status indicators, having a status of incomplete:

compute new parity data based on source data associated with the status indicator;

store the new parity data at a location of the parity region corresponding to a location of the status indicator in the parity bitmap; and update the status indicator from incomplete to complete.

16. The one or more non-transitory computer-readable storage media of claim 15, wherein the storage aggregate comprises one or more redundancy groups each comprising a subset of the multiple drives that provides redundancy with respect to each other.

17. The one or more non-transitory computer-readable storage media of claim 16, wherein the multiple drives comprise data drives and parity drives, and wherein the subset of the multiple drives of a given redundancy group, of the one or more redundancy groups, comprises two or more data drives and one or more parity drives.

18. The one or more non-transitory computer-readable storage media of claim 17, wherein to compute the new parity data based on the source data associated with the status indicator, the program instructions direct the one or more processors to:

obtain data from two or more drives other than the parity drive; and perform a parity operation using the data resulting in the new parity data.

19. The one or more non-transitory computer-readable storage media of claim 18, wherein:

the two or more drives correspond to a redundancy group of the one or more redundancy groups; and the redundancy group comprises the parity drive.

20. The one or more non-transitory computer-readable storage media of claim 15, wherein to store the new parity data at the location of the parity region corresponding to the location of the status indicator in the parity bitmap, the program instructions direct the one or more processors to overwrite existing parity data at the location of the parity region corresponding to the location of the status indicator in the parity bitmap.

\* \* \* \* \*